United States Patent
Terres et al.

(10) Patent No.: US 7,662,216 B1
(45) Date of Patent: Feb. 16, 2010

(54) IN-LINE FILTER AND SERVICE METHOD

(75) Inventors: Mark A. Terres, Stoughton, WI (US);
Jeffrey S. Morgan, Stoughton, WI (US);
Barry M. Verdegan, Stoughton, WI (US);
Scott P. Heckel, Stoughton, WI (US);
Eric A. Janikowski, Jefferson, WI (US);
Scott W. Schwartz, Fort Atkinson, WI (US)

(73) Assignee: Fleetguard, Inc., Nashville, TN (US)

( * ) Notice: Subject to any disclaimer, the term of this patent is extended or adjusted under 35 U.S.C. 154(b) by 398 days.

(21) Appl. No.: 11/429,149

(22) Filed: May 5, 2006

(51) Int. Cl.
*B01D 46/00* (2006.01)
(52) U.S. Cl. .............................. 95/273; 55/498; 55/502; 55/503; 55/482
(58) Field of Classification Search .............. 55/385.3, 55/488, 497, 502, 492, 503, 504, 493, 521, 55/482, 498; 123/198 E
See application file for complete search history.

(56) References Cited

U.S. PATENT DOCUMENTS

| | | | |
|---|---|---|---|
| 5,391,212 A * | 2/1995 | Ernst et al. ................. | 55/385.3 |
| 6,126,708 A | 10/2000 | Mack et al. | |
| 6,217,627 B1 * | 4/2001 | Vyskocil et al. .............. | 55/492 |
| 6,231,630 B1 * | 5/2001 | Ernst et al. .................. | 55/385.3 |
| 6,306,192 B1 * | 10/2001 | Greif et al. .................... | 55/498 |
| 6,375,700 B1 * | 4/2002 | Jaroszczyk et al. ............ | 55/498 |
| 6,387,143 B1 * | 5/2002 | Adiletta ....................... | 55/497 |
| 6,391,076 B1 | 5/2002 | Jaroszczyk et al. | |
| 6,416,561 B1 | 7/2002 | Kallsen et al. | |
| 6,511,599 B2 | 1/2003 | Jaroszczyk et al. | |
| 6,610,117 B2 | 8/2003 | Gillingham et al. | |
| 6,673,136 B2 | 1/2004 | Gillingham et al. | |
| 6,966,940 B2 * | 11/2005 | Krisko et al. .................. | 55/497 |
| 7,396,375 B2 * | 7/2008 | Nepsund et al. ............... | 55/481 |
| 7,396,377 B2 * | 7/2008 | Lampert et al. ............... | 55/502 |
| 2002/0040569 A1 * | 4/2002 | Reinhold ...................... | 55/498 |
| 2002/0152732 A1 * | 10/2002 | Kallsen et al. ................ | 55/482 |
| 2003/0217534 A1 * | 11/2003 | Krisko et al. .................. | 55/337 |
| 2005/0229561 A1 * | 10/2005 | Nepsund et al. ............... | 55/481 |
| 2007/0175187 A1 * | 8/2007 | Kopec et al. ............... | 55/385.3 |
| 2008/0196370 A1 * | 8/2008 | Schramm et al. ............. | 55/498 |

* cited by examiner

*Primary Examiner*—Duane Smith
*Assistant Examiner*—Minh-Chau T Pham
(74) *Attorney, Agent, or Firm*—Andrus, Sceales, Starke & Sawall, LLP; J. Bruce Schelkopf

(57) ABSTRACT

An in-line filter assembly includes an inlet duct housing, an intermediate housing, and an outlet duct housing, and seals a filter element in the intermediate housing and facilitates removal and replacement thereof.

19 Claims, 3 Drawing Sheets

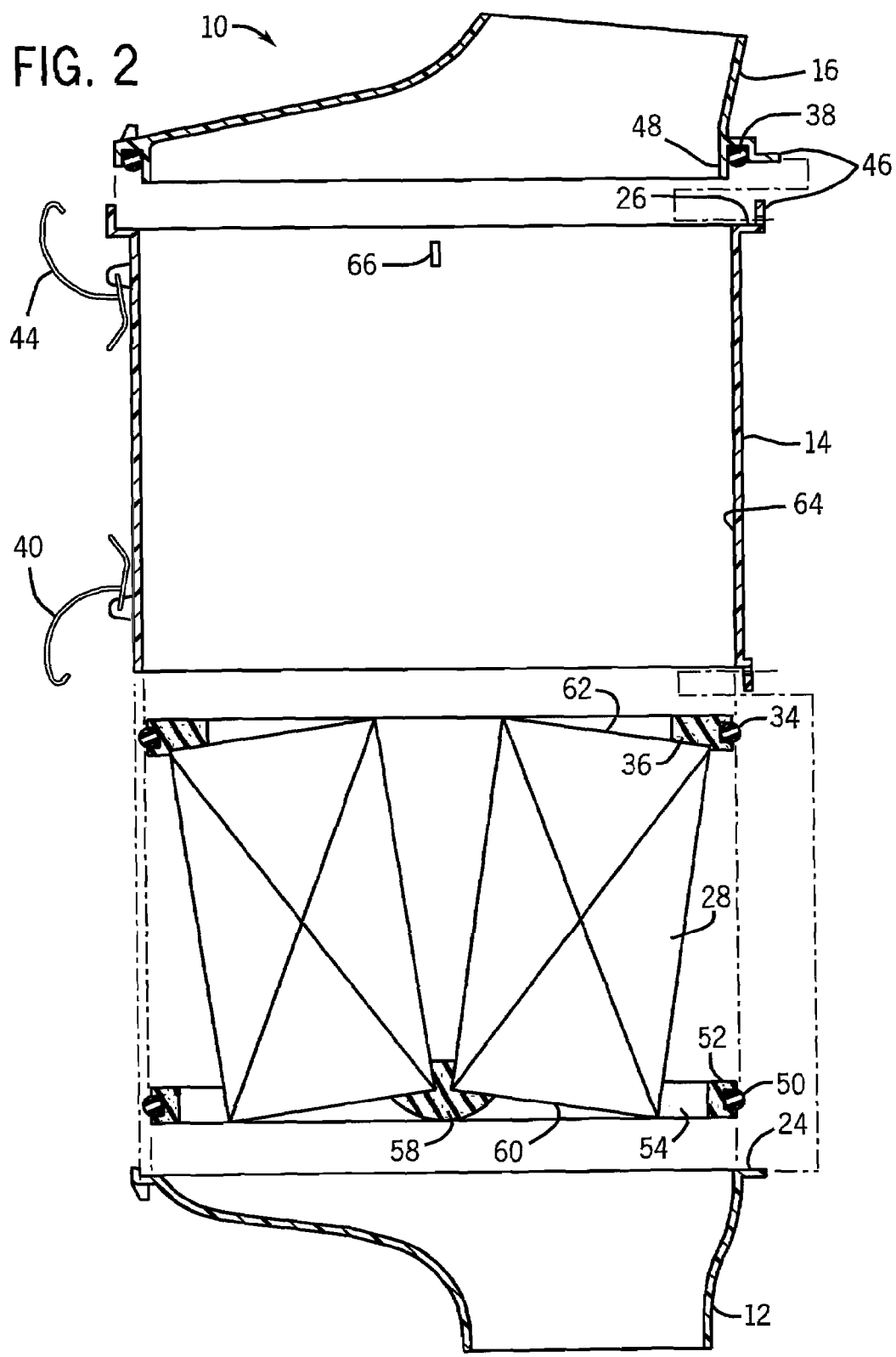

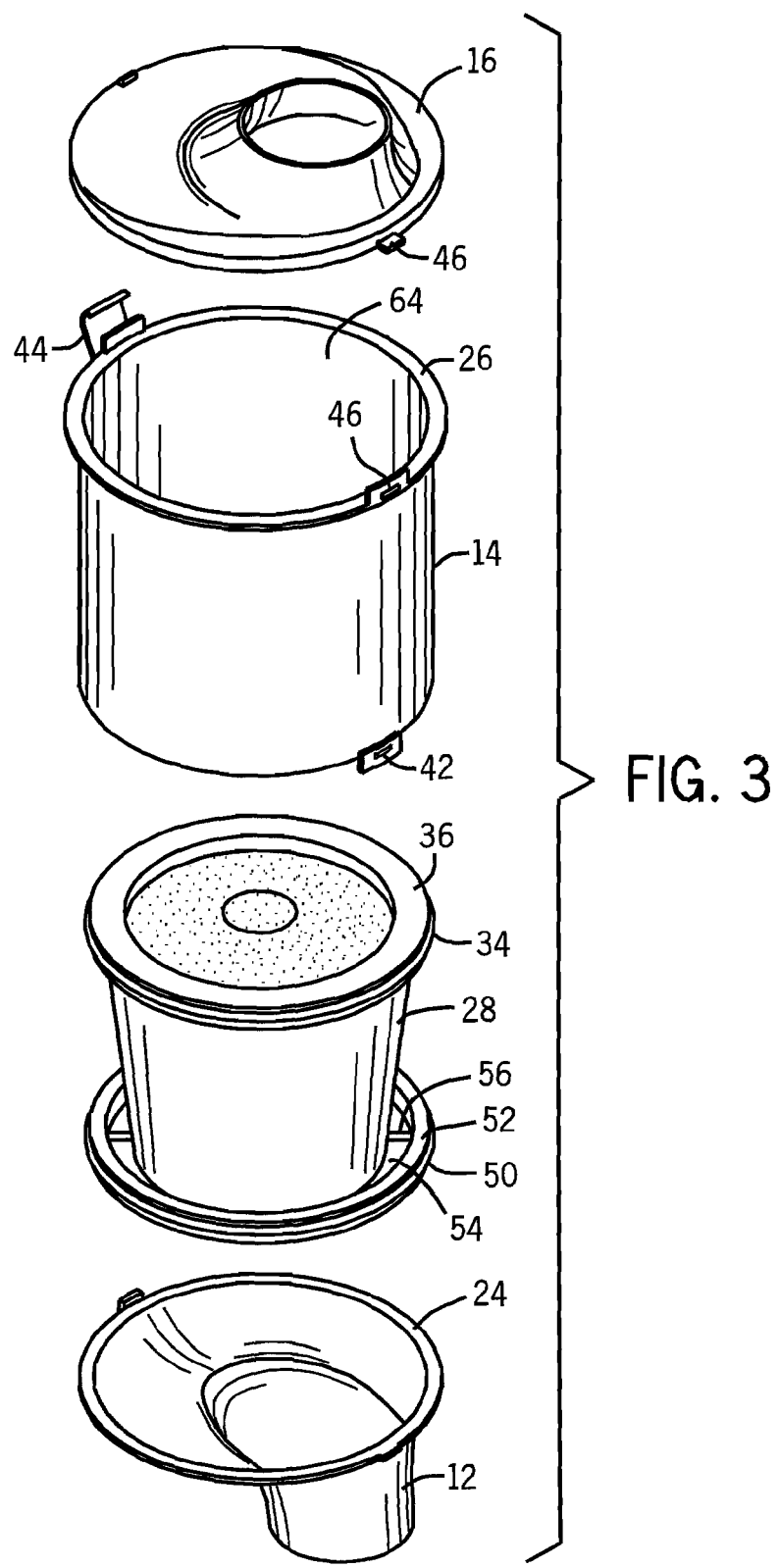

IN-LINE FILTER AND SERVICE METHOD

BACKGROUND AND SUMMARY

The invention relates to in-line filter assemblies and servicing methods.

An in-line filter assembly has an inlet duct axially aligned in-line along an axis with an outlet duct, and a filter element therebetween filtering fluid flowing axially therethrough. The present invention arose during continuing development efforts directed towards such assemblies, including improvements facilitating replaceability of the filter element, serviceability, cost savings to minimize the number of discarded parts upon servicing and the reduced environmental impact thereof, and in the case of automotive application enabling servicing and replacement in tight under-hood conditions.

BRIEF DESCRIPTION OF THE DRAWINGS

FIG. 2 is an exploded view of the assembly of FIG. 1.

FIG. 3 is an exploded perspective view of the assembly of FIG. 1.

DETAILED DESCRIPTION

Figure 1:
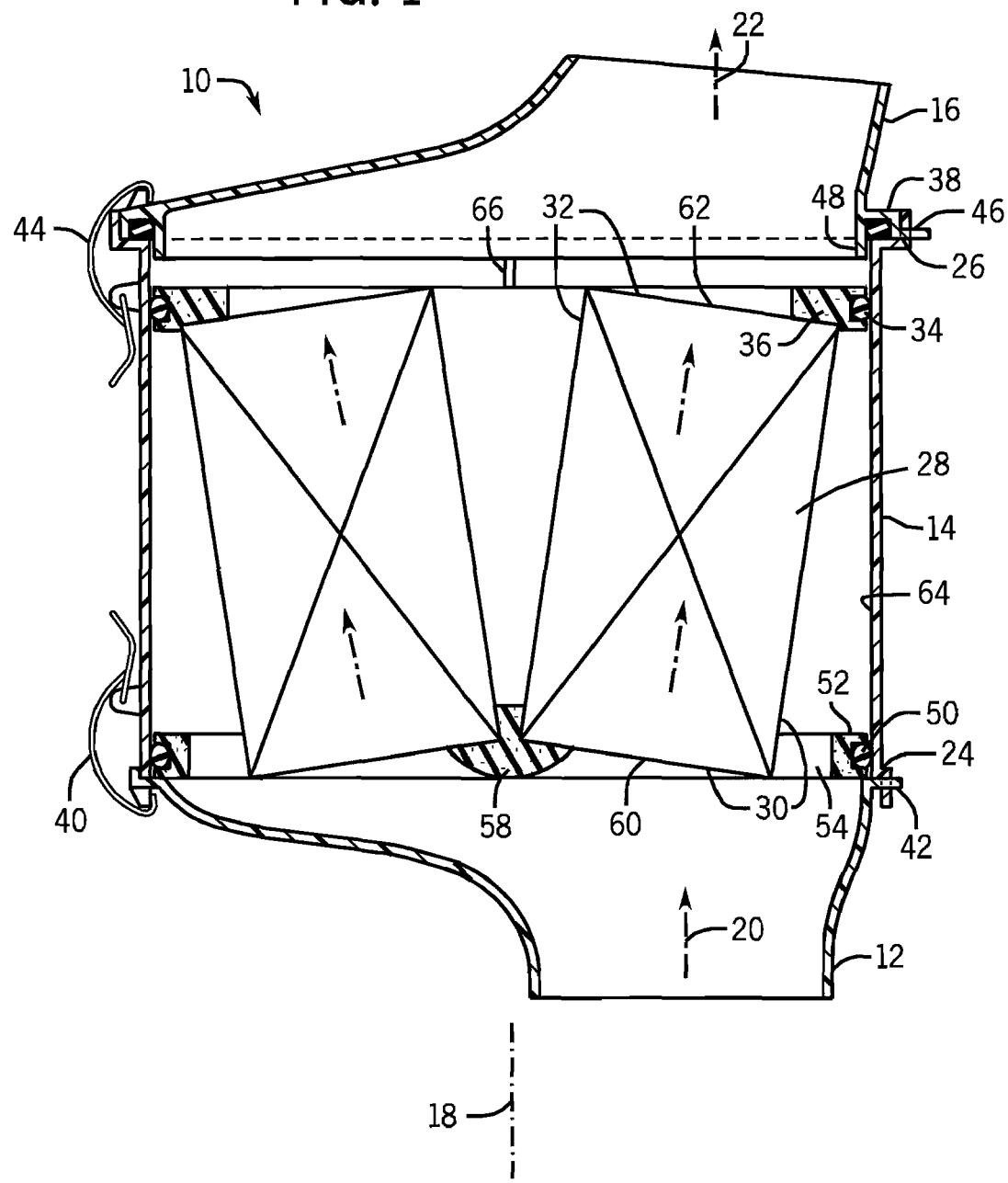
FIG. 1 is a sectional view of an in-line filter assembly constructed in accordance with the invention.

FIGS. 1-3 show an in-line filter assembly 10 including an inlet duct housing 12, an intermediate housing 14, and an outlet duct housing 16 axially aligned in-line along an axis 18. In one implementation in an automotive application for on-highway trucks and off-highway vehicles, the filter assembly is an under-hood air cleaner receiving dirty unfiltered fluids such as air at 20, and discharging clean filtered fluid such as air at 22, for example which may be the combustion air for the internal combustion engine of the vehicle.

Inlet duct housing 12 mates with intermediate housing 14 at a first interface 24. Outlet duct housing 16 mates with intermediate housing 14 at a second interface 26. A filter element 28 is provided in intermediate housing 14 and filters fluid flowing axially therethrough from an upstream dirty side 30 to a downstream clean side 32. The filter element is an annular member having a closed-loop shape, e.g. circular, oval, elliptical, racetrack shaped, etc., and may be a pleated element for example as shown in U.S. Pat. Nos. 6,511,599, 6,416,561, 6,391,076 or commonly owned U.S. patent application Ser. No. 11/247,619, filed Oct. 11, 2005, now U.S. Pat. No. 7,323,106, all incorporated herein by reference. Interface 24 is upstream of filter element 28. Interface 26 is downstream of filter element 28.

A first seal 34 seals filter element 28, for example at its downstream annular end cap 36, to intermediate housing 14 and prevents bypass of dirty unfiltered fluid from upstream dirty side 30 of the filter element to downstream clean side 32 of the filter element. A second seal 38 seals intermediate housing 14 to outlet duct housing 16 at interface 26 and prevents entry of ambient dirty unfiltered fluid through such interface downstream of filter element 28. A first connector such as clamp 40 and hook-and-eye arrangement 42, connects inlet duct housing 12 and intermediate housing 14 at interface 24. A second connector, such as clamp 44 and hook-and-eye arrangement 46, connects outlet duct housing 16 and intermediate housing 14 at interface 26 and compresses seal 38 in sealing relation thereat. Other types of connectors may be used.

Inlet duct housing 12 is detachably mounted to intermediate housing 14 by the noted first connector 40, 42. Outlet duct housing duct 16 is detachably mounted to intermediate housing 14 by the noted second connector 44, 46. Inlet duct housing 12 is detachable and removable from intermediate housing 14, with outlet duct housing 16 in place and remaining attached to intermediate housing 14, with the noted sealing provided by second seal 38 intact and unbroken to maintain the integrity thereof and protect components downstream thereof. Filter element 28 is removable from intermediate housing 14 while inlet duct housing 12 is detached and removed from intermediate housing 14. Filter element 28 is removable from intermediate housing 14, with outlet duct housing 16 in place and remaining attached to intermediate housing 14, with the noted sealing by second seal 38 intact and unbroken to maintain the integrity thereof. Filter element 28 is removable and replaceable without removing nor replacing intermediate housing 14. This is considered an advantage for cost savings and for environmental impact.

The noted first seal 34 is provided by a first gasket bearing between filter element 28 at end cap 36 and intermediate housing 14. The noted second seal 38 is provided by a second gasket bearing between outlet duct housing 16 and intermediate housing 14. Outlet duct housing 16 has an annular lip 48 extending axially toward first gasket 34 and over which second gasket 38 is stretched in circumscribing relation. In one embodiment, the diameter of lip 48 is equal to the diameter of first gasket 34. Gasket 34 is axially spaced from gasket 38 and is upstream thereof toward inlet duct housing 12. A third gasket 50 bears between filter element 28 at its upstream annular end cap 52 and intermediate housing 14. In one embodiment, gaskets 34, 38, 50 are O-rings, though other types of seals may be used. Gasket 34 is axially spaced between gaskets 38 and 50. End cap 52 of the filter element is an annular member which may be spaced radially outwardly of the upstream outer edge of the filter element by a gap 54 permitting passage of fluid therethrough, and connected by a plurality of radial spokes such as 56 to a central hub 58 which blocks fluid flow therethrough to clean side 32, as is known. Filter element 28 has an upstream face 60 at upstream dirty side 30 and axially facing inlet duct housing 12. The filter element has a downstream face 62 at downstream clean side 32 and axially facing outlet duct housing 16. Gasket 34 is at downstream face 62. Gasket 50 is at upstream face 60. Gasket 50 is in non-sealing relation relative to the filter element and permits passage of incoming dirty fluid axially therepast at 54, which fluid is blocked by gasket 34 providing the noted seal. Gasket 50 provides guidance and locational centering of the filter element within intermediate housing 14 in combination with gasket 34.

Intermediate housing 14 has an axially extending sidewall 64. Each of gaskets 34 and 50 are radially engaged and compressed between the filter element at respective end caps 36, 52 and sidewall 64 and are axially slidable therealong to permit axial withdrawal of filter element 28 from intermediate housing 14 toward the upstream side when inlet duct housing 12 is removed from intermediate housing 14. Sidewall 64 may include one or more protrusions such as 66 providing a stop which limits upward axial insertion movement of filter element 28 into intermediate housing 14 by engaging end cap 36 to stop such upward axial insertion movement. Gasket 38 is axially engaged and compressed between outlet duct housing 16 and intermediate housing 14. Gasket 38 is of larger diameter than each of gaskets 34 and 50.

The system provides a method for servicing an in-line filter assembly. The method includes detaching and removing inlet duct housing 12 from intermediate housing 14 with outlet duct housing 16 in place and remaining attached to intermediate housing 14 with the noted sealing by the second seal 38 intact and unbroken to maintain the integrity thereof. The method involves removing filter element 28 from intermediate housing 14 while inlet duct housing 12 is detached and removed from intermediate housing 14. The method includes removing filter element 28 from intermediate housing 14 with outlet duct housing 16 in place and remaining attached to intermediate housing 14 with the noted sealing by second seal 38 intact and unbroken to maintain the integrity thereof, enabling removal and replacement of filter element 28 without removing nor replacing intermediate housing 14. The method includes providing intermediate housing 14 with axially extending sidewall 64, providing first seal 34 as a radial seal radially bearing between filter element 28 and sidewall 64, and removing filter element 28 from intermediate housing 14 by axially sliding filter element 28 along sidewall 64 toward the upstream side.

It is recognized that various equivalents, alternatives and modifications are possible within the scope of the appended claims.

What is claimed is:

1. An in-line filter assembly comprising an inlet duct housing, an intermediate housing having an axially extending inner sidewall, and an outlet duct housing axially aligned in-line along an axis, said inlet duct housing mating with said intermediate housing at a first interface, said outlet duct housing mating with said intermediate housing at a second interface, a filter element in said intermediate housing and filtering fluid flowing axially therethrough from an upstream dirty side to a downstream clean side, said first interface being upstream of said filter element, said second interface being downstream of said filter element, a first seal sealing said filter element to said intermediate housing at said inner sidewall and preventing bypass of dirty unfiltered fluid from said upstream dirty side of said filter element to said downstream clean side of said filter element, a second seal sealing said intermediate housing to said outlet duct housing at said second interface downstream of said filter element and preventing entry of dirty unfiltered fluid through said second interface downstream of said filter element, said first seal being a radial seal axially slidable along said inner sidewall of said intermediate housing, said filter element being axially insertable into said intermediate housing with said radial seal axially sliding along said inner sidewall of said intermediate housing.

2. The in-line filter assembly according to claim 1 wherein said outlet duct housing and said intermediate housing at said second interface compress said second seal in sealing relation thereat.

3. The in-line filter assembly according to claim 2 wherein in combination:
said inlet duct housing is detachably mounted to said intermediate housing by a first connector;
said outlet duct housing is detachably mounted to said intermediate housing by a second connector;
said inlet duct housing is detachable and removable from said intermediate housing with said outlet duct housing in place and remaining attached to said intermediate housing with said sealing by said second seal intact and unbroken to maintain the integrity thereof and protect components downstream thereof.

4. The in-line filter assembly according to claim 3 wherein in combination said filter element is removable from said intermediate housing while said inlet duct housing is detached and removed from said intermediate housing, said filter element being removable from said intermediate housing with said outlet duct housing in place and remaining attached to said intermediate housing with said sealing by said second seal intact and unbroken to maintain the integrity thereof, whereby said filter element is removable and replaceable without removing nor replacing said intermediate housing.

5. The in-line filter assembly according to claim 1 wherein said first seal comprises a first gasket bearing between said filter element and said intermediate housing, said second seal comprises a second gasket bearing between said outlet duct housing and said intermediate housing.

6. The in-line filter assembly according to claim 5 wherein said outlet duct housing has an annular lip extending axially toward said first gasket and over which said second gasket is stretched in circumscribing relation, the diameter of said lip being equal to the diameter of said first gasket.

7. The in-line filter assembly according to claim 5 wherein said first gasket is axially spaced from second gasket and is upstream thereof toward said inlet duct housing.

8. The in-line filter assembly according to claim 7 comprising a third gasket bearing between said filter element and said intermediate housing, said first gasket being axially spaced between said second and third gaskets.

9. The in-line filter assembly according to claim 8 wherein:
said filter element has an upstream face at said upstream dirty side and axially facing said inlet duct housing;
said filter element has a downstream face at said downstream clean side and axially facing said outlet duct housing;
said first gasket is at said downstream face;
said third gasket is at said upstream face.

10. The in-line filter assembly according to claim 9 wherein said third gasket is non-sealing relative to said filter element and permits passage of incoming dirty fluid axially therepast, which fluid is blocked by said first gasket providing said first seal.

11. The in-line filter assembly according to claim 8 wherein said inlet duct housing is detachably mounted to said intermediate housing, and said intermediate housing comprises an axially extending sidewall, and each of said first and third gaskets is radially engaged between said filter element and said sidewall and axially slidable therealong to permit axial withdrawal of said filter element from said intermediate housing toward said upstream side when said inlet duct housing is removed from said intermediate housing.

12. The in-line filter assembly according to claim 11 wherein said second gasket is axially engaged and compressed between said outlet duct housing and said intermediate housing.

13. The in-line filter assembly according to claim 12 wherein said second gasket is of larger diameter than each of said first and third gaskets.

14. The in-line filter assembly according to claim 11 wherein at least said first and third gaskets are O-rings.

15. A method for servicing an in-line filter assembly having an inlet duct housing, an intermediate housing having an axially extending inner sidewall, and an outlet duct housing axially aligned in-line along an axis, said inlet duct housing mating with said intermediate housing at a first interface, said outlet duct housing mating with said intermediate housing at a second interface, a filter element in said intermediate housing and filtering fluid flowing axially therethrough from an upstream dirty side to a downstream clean side, said first interface being upstream of said filter element, said second interface being downstream of said filter element, a first seal sealing said filter element to said intermediate housing at said inner sidewall and preventing bypass of dirty unfiltered fluid from said upstream dirty side of said filter element to said downstream clean side of said filter element, a second seal sealing said intermediate housing to said outlet duct housing at said second interface downstream of said filter element and preventing entry of dirty unfiltered fluid through said second interface downstream of said filter element, said first seal being a radial seal axially slidable along said inner sidewall of said intermediate housing, said method comprising detaching and removing said inlet duct housing from said intermediate housing with said outlet duct housing in place and remaining attached to said intermediate housing with said sealing by said second seal intact and unbroken to maintain the integrity thereof, said filter element being axially insertable into said intermediate housing with said radial seal axially sliding along said inner sidewall of said intermediate housing.

16. The method of according to claim 15 comprising removing said filter element axially from said intermediate housing while said inlet duct housing is detached and removed from said intermediate housing.

17. The method according to claim 16 comprising removing said filter element axially from said intermediate housing with said outlet duct housing in place and remaining attached to said intermediate housing with said sealing by said second seal intact and unbroken to maintain the integrity thereof, enabling axial removal and replacement of said filter element without removing nor replacing said intermediate housing.

18. The method according to claim 17 comprising providing said intermediate housing with an axially extending sidewall, providing said first seal as a radial seal radially bearing between said filter element and said sidewall, and comprising removing said filter element from said intermediate housing by axially sliding said filter element along said sidewall toward said upstream side.

19. The in-line filter assembly according to claim 1 wherein said filter element is axially insertable into said intermediate housing through an axial access opening at said first interface upon detachment of said inlet duct housing and said intermediate housing.

\* \* \* \* \*

UNITED STATES PATENT AND TRADEMARK OFFICE
CERTIFICATE OF CORRECTION

| | | |
|---|---|---|
| PATENT NO. | : 7,662,216 B1 | Page 1 of 1 |
| APPLICATION NO. | : 11/429149 | |
| DATED | : February 16, 2010 | |
| INVENTOR(S) | : Terres et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 553 days.

Signed and Sealed this

Twenty-eighth Day of December, 2010

David J. Kappos
*Director of the United States Patent and Trademark Office*